(12) United States Patent
Baade et al.

(10) Patent No.: US 8,690,180 B1
(45) Date of Patent: Apr. 8, 2014

(54) TOWING ADAPTER

(71) Applicants: Ronald R. Baade, Winnetka, IL (US);
John E. Callahan, Plainfield, IL (US);
Gary C. Good, McHenry, IL (US)

(72) Inventors: Ronald R. Baade, Winnetka, IL (US);
John E. Callahan, Plainfield, IL (US);
Gary C. Good, McHenry, IL (US)

(73) Assignee: HG Aircraft Products LLC, North Palm Beach, FL (US)

( * ) Notice: Subject to any disclaimer, the term of this patent is extended or adjusted under 35 U.S.C. 154(b) by 0 days.

(21) Appl. No.: 13/790,938

(22) Filed: Mar. 8, 2013

(51) Int. Cl.
*B60D 1/155* (2006.01)

(52) U.S. Cl.
USPC ..... 280/493; 280/491.1; 280/480; 244/100 R; 244/50; 294/167; 294/169

(58) Field of Classification Search
USPC ............. 280/493, 491.1, 480; 244/100 R, 50; 294/167, 169
See application file for complete search history.

(56) References Cited

U.S. PATENT DOCUMENTS

| | | | |
|---|---|---|---|
| 1,845,859 A * | 2/1932 | Williamson | 280/480 |
| 2,130,108 A * | 9/1938 | Struhs | 280/490.1 |
| 2,747,891 A * | 5/1956 | Neff | 280/480 |
| 3,504,811 A * | 4/1970 | Wegener et al. | 294/74 |
| 3,709,522 A | 1/1973 | Olson | |
| 3,829,131 A | 8/1974 | Moore, Jr. | |
| 3,955,832 A | 5/1976 | Kalmanson | |
| 3,955,878 A | 5/1976 | Nowak | |
| 4,303,213 A * | 12/1981 | Bolender et al. | 244/137.3 |
| 4,418,936 A | 12/1983 | Adams et al. | |
| 5,100,083 A | 3/1992 | Large et al. | |
| 5,129,667 A | 7/1992 | Gratton | |
| 5,308,101 A * | 5/1994 | Monty | 280/480.1 |
| 5,524,914 A * | 6/1996 | Doherty et al. | 280/24 |
| 5,967,541 A | 10/1999 | Johansen | |
| 6,467,790 B1 | 10/2002 | Hurley | |
| 6,920,966 B2 | 7/2005 | Buchele et al. | |
| 7,883,103 B1 * | 2/2011 | Greaves, Jr. | 280/507 |
| 7,997,015 B2 * | 8/2011 | Belzile et al. | 37/231 |
| 2012/0132742 A1 | 5/2012 | O'Connell | |

* cited by examiner

*Primary Examiner* — Joseph M Rocca
*Assistant Examiner* — Marlon Arce
(74) *Attorney, Agent, or Firm* — Blank Rome LLP

(57) ABSTRACT

A towing adapter can be used during towing of an airplane. The adapter is made of rigid steel with a rubber under-coating and includes two Velcro straps. The device is strapped to two folding struts that are folded down from the wheel assembly of the aircraft. It has a specific angle that keeps the struts at a certain angle with respect to each other, so that struts are accessible to users and is prevented from falling down and injuring someone or causing damage. The device can be easily removed when the towing is finished, and the struts are folded back up onto the plane.

17 Claims, 4 Drawing Sheets

TOWING ADAPTER

BACKGROUND OF THE INVENTION

1. Field of the Invention

The present invention relates to towing devices used to tow airplanes. More particularly, the present invention relates to a towing adapter to maintain the struts of an airplane at a desired configuration during towing.

2. Background of the Related Art

Airplanes often have to move around an airport by tow vehicles, such as to between gates or to pull into or out of a gate. FIG. 1 shows a front wheel assembly of an airplane fitted with a torque link assembly 10. The torque link assembly 10 can include two struts 12, 14 that connect to the wheel assembly about the wheel 16 and axle 18. The torque link assembly 10 is shown in a storage position for operation of the airplane without towing. The struts 12, 14 are elongated metal arms that are connected to one another about a central pivot point 20. The lower strut arm 14 is connected to a lower portion of the vertical plane axle at a lower connection point 22. The upper strut arm 12 is connected to an upper portion of the vertical plane axle at an upper connection point 24. The lower connection 22 permanently connects the torque link assembly 10. The lower strut 14 can rotate up and down about the lower connection 22.

In the storage position, the struts 12, 14 are folded up and the top strut 12 is connected to the vertical axle of the wheel assembly at the upper connection point 24. The torque assembly 10 is thereby locked to the aircraft and does not move. The torque assembly 10 is moved to the operating position when the airplane needs to be towed. Here, the top strut 12 is released from the upper connection point 24 and lowered downward. The central pivot point 20 allows the strut arms 12, 14 to rotate with respect to one another, so that the arms 12, 14 can be lowered down and properly positioned for attachment to a tow vehicle. The torque assembly 10 can only move in the up and down directions. The torque assembly 10 itself does not move in the left and right direction, but instead moves the plane wheel assembly left and right for towing and positioning.

One difficulty with the torque assembly 10 is that the lower connection 22 and/or the pivot connection 20 can over-rotate. And, the torque links are unsupported and unrestrained. Consequently, the strut arms 12, 14 can lower all the way down until the upper strut arm 12 hits the ground, an object, or the aircraft, potentially causing injury or damage.

SUMMARY OF THE INVENTION

Accordingly, it is an object of the invention to provide a mechanism to prevent unrestricted rotational movement of the torque struts 12, 14. It is another object of the invention to provide a towing adapter that permits the torque assembly to be utilized for towing operations, while at the same time limiting rotational movement of the torque struts 12, 14. It is a further object of the invention to provide a removable towing adapter that can be utilized in the operating mode to permit towing, and can be quickly and easily removed so that the torque assembly can be positioned in the storage mode.

A towing adapter can be used during towing of an airplane. The adapter is made of rigid steel with a rubber under-coating and includes two Velcro straps. The device is strapped to two folding struts that are folded down from the wheel assembly of the aircraft. It has a specific angle that keeps the struts at a certain angle with respect to each other, so that struts are accessible to users and is prevented from falling down and injuring someone or causing damage. The device can be easily removed when the towing is finished, and the struts are folded back up onto the plane.

These and other objects of the invention, as well as many of the intended advantages thereof, will become more readily apparent when reference is made to the following description, taken in conjunction with the accompanying drawings.

DETAILED DESCRIPTION OF THE PREFERRED EMBODIMENTS

Figure 1:
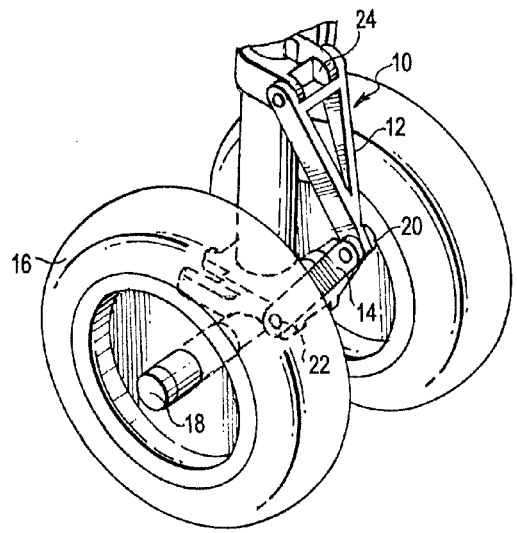
FIG. 1 is a perspective view of the torque link assembly of the prior art.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several preferred embodiments of the invention are described for illustrative purposes, it being understood that the invention may be embodied in other forms not specifically shown in the drawings.

Figure 2:
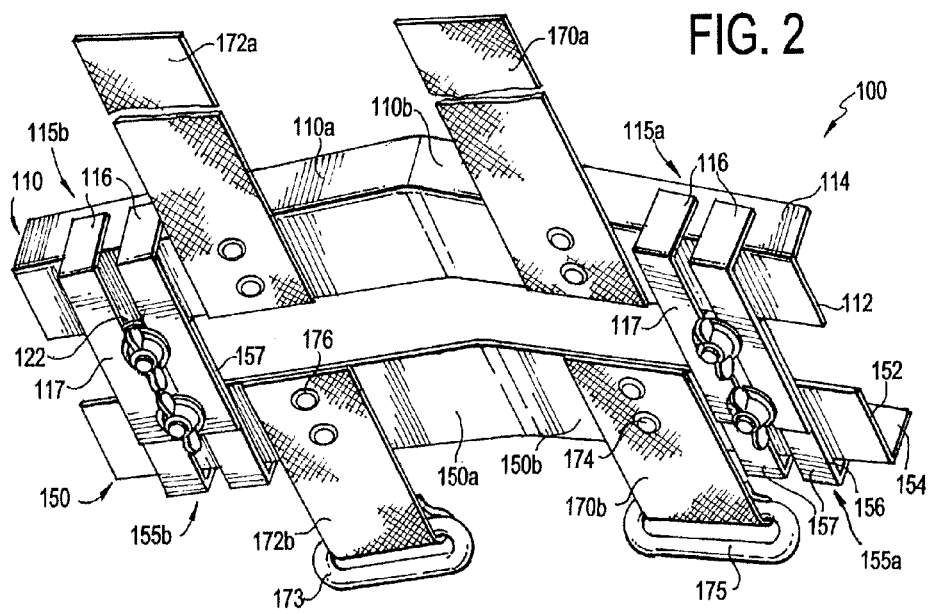
FIG. 2 is a perspective view of the towing adapter in accordance with one embodiment of the invention.
Figure 6:
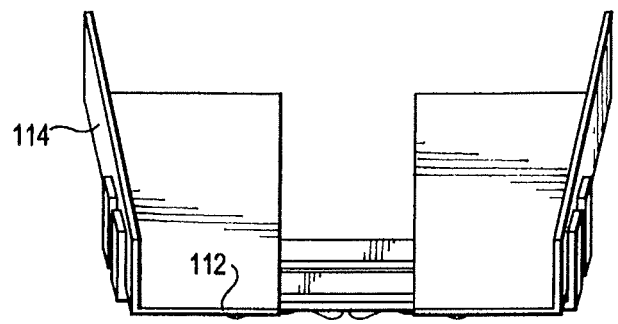
FIG. 6 is a front end view of the towing adapter of FIG. 2.

Turning to the drawings, FIG. 2 shows the towing adapter 100 of the present invention. The towing adapter 100 generally includes a first support member 110 and a second support member 150. The two support members 110, 150 are elongated and are formed as a unitary, one-piece member having an L-shaped cross-section (as best shown in FIG. 6) formed by a top flat platform 112, 152 and a downward extending longitudinal side 114, 154, respectively. The sides 114, 154 are formed along the outer longitudinal end of the support members 110, 150. The top platform 112, 152 is integrally formed with the respective side 114, 154 at a right angle thereto. The towing adapter 100 is shown upside-down in the embodiment of FIG. 2, to better illustrate the features of the device.

Figure 5:
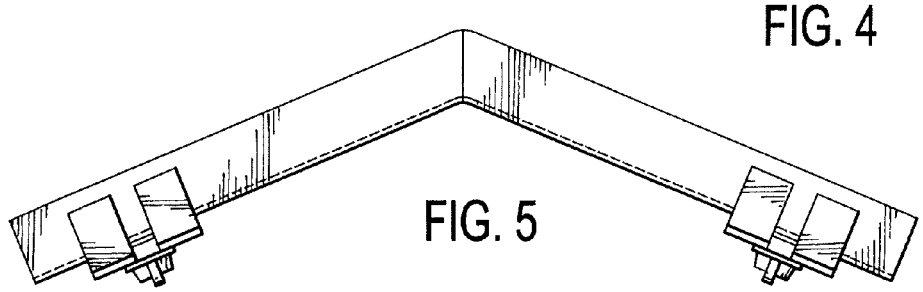
FIG. 5 is a side view of the towing adapter of FIG. 2.

Each of the support members 110, 150 are bent at their center transverse axis to form respective left/right support members 110a, 110b, 150a, 150b. As best shown in the side view of FIG. 5, the top platform 112, 152 of the left support members 110a, 150a are at a desired predetermined angle with respect to the top platform 112, 152 of the right support members 110b, 150b. In accordance with an illustrative, non-limiting example of the invention, the predetermined angle is preferably forty-five to fifty degrees)(45-50°, thereby forming a general V-shape. It should be recognized, however, that any suitable angle can be utilized, and that the support members 110, 150 can be straight and not bent.

The first and second support members 110, 150 are elongated, with two end portions. A cross-support assembly is provided at each of the two distal end portions, such that there is a first cross-support assembly 115a, 155a at a first distal end of each of the support members 110, 150, and a second cross-support assembly 115b, 155b at a second distal end of each of the support members 110, 150, respectively. The cross-support assemblies 115, 155 are each formed by two narrow elongated L-shaped arms defining a short base 116, 156 and an elongated cross-member 117, 157. The base 116, 156 of each arm is connected to the side 114, 154 of the support members 110, 150, such as by welding or being integrally molded.

The bases 116, 156 extend beyond the top surface of the top platforms 112, 152, so that the cross-members 117, 157 are spaced apart and above the top platforms 112, 152. The support members 110, 150 are configured to be substantially parallel with one another and are spaced apart to form a gap therebetween. Each of the cross-support assemblies 115a, 115b, 155a, 155b have two cross-members 117, 157 that are parallel with and spaced apart from one another to form an elongated slot therebetween. The cross-members 117, 157 extend in a transverse direction to bridge the gap between he support members 110, 150 so that the distal ends of each cross-member 117, 157 overlap. Thus, at least a portion of the two cross-members 117a, b attached to the first support member 110 overlap with at least a portion of the cross-members 157a, b attached to the second support member 110. For instance, the first cross-members 117a, b can be aligned to extend over the top surface of the second cross-members 157a, b, respectively.

One or more wing nuts 118 are positioned in the elongated slot located between the cross-members 117, 157. The head of the bolt engages the underside of the lower cross-support member 157, and the bolt extends through the slot. The wing nut engages the threaded bolt and engages the top side of the upper cross-support member 117. Thus, the wing nuts 118 couple the overlapping cross-members 117a, 157a and 117b, 157b together. Accordingly, the first support member 110 can be positioned at a variable distance apart from the second support member 150. Once a desired distance is obtained, the support members 110, 150 can be locked together by use of the wing nuts 18. To adjust the distance between the support members 110, 150, the wing nuts 18 can be loosened slightly and the support members 110, 150 slid along the cross-members 117, 157 to the new distance. The wing nuts 18 are then retightened to again lock the support members 110, 150 together. Though two support assemblies 115a, b and 155a, b are shown, more than one support assembly can be provided, or only a single support assembly can be provided.

Figure 3:
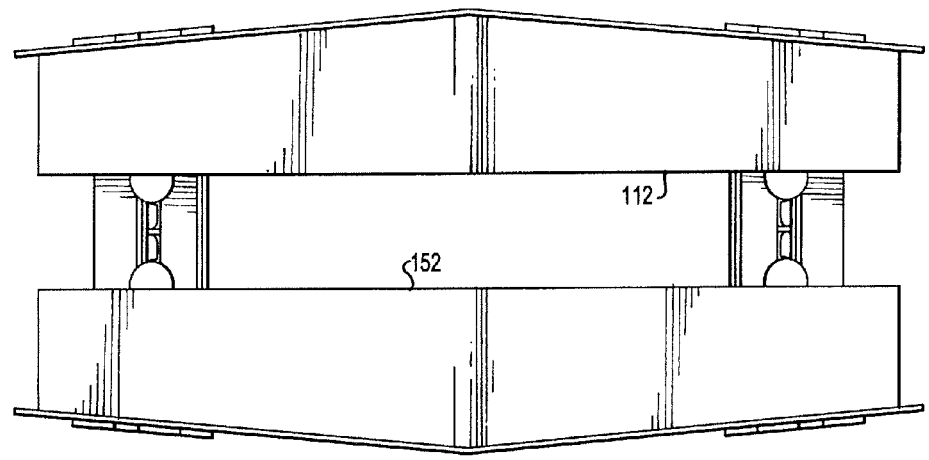
FIG. 3 is a bottom view of the towing adapter of FIG. 2.

Referring now to FIG. 3, the bottom of the towing adapter 100 is shown. A tough rubber coating is coated over the bottom surface of the top platform 112, 152 and the inside surface of the sides 114, 154. The rubber coating provides a softer surface that contacts the metal surfaces of the torque assembly 10. That avoids a metal-on-metal contact that might create noise or a spark.

The two support members 110, 150 and the cross-support assemblies 115, 155 are made of a rigid material, preferably a metal such as Stainless Steel and Powder Coated Steel. As further shown in FIG. 3, each of the support members 110, 150 have a straight inner edge that faces the opposite support member 110, 150. The support members 110, 150 can be narrower at the distal ends (approximately 1⅝ inches) and wider in the middle (approximately 2 5/32 inches). The platform 112, 152 can be about 12 inches long and 0.34 inches thick. The support members 110, 150 can be separated by a distance from 0-2½ inches.

Figure 4:
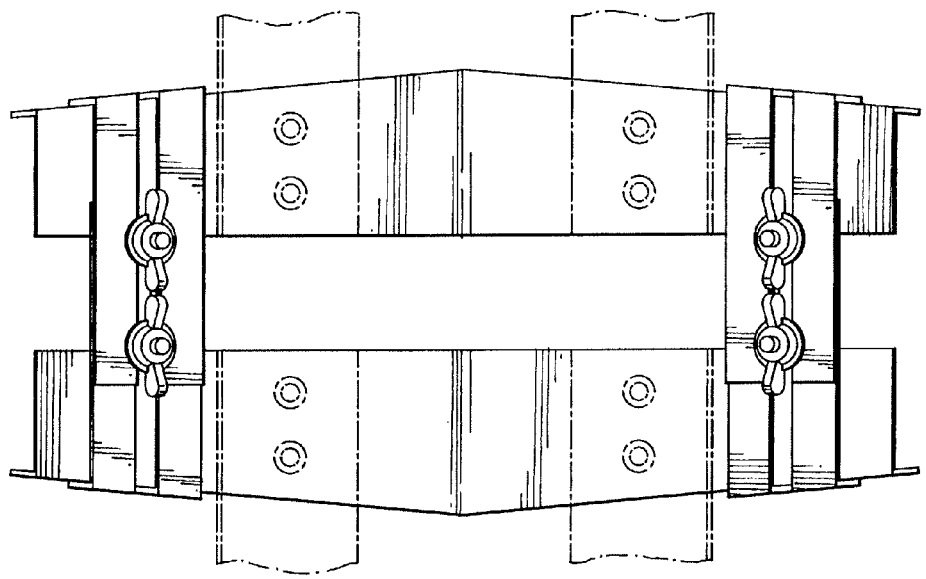
FIG. 4 is a top view of the towing adapter of FIG. 2.

Referring to FIGS. 2 and 4, two first fastening straps 170a, 172a are coupled to the first support member 110 by two rivets 176a, 174a, respectively. The straps are elongated and positioned transversely across the support members 110, 150. The straps are preferably connected inside the cross-support assemblies 115, though any suitable location can be utilized. The first straps 170a, 172a have an open distal end. Two second elongated fastening straps 170b, 172b are transversely coupled to the second support member 150 by two rivets 176b, 174b, and aligned with the first straps 170a, 172a. The distal ends of the second straps 170b, 172b have a coupling loop 173, 175. The loop 173, 175 receives the open distal ends of the first straps 170a, 172a, which then wraps back around and fastens to the surface of the straps 170a, b, 172a, b at the top of the support members 110, 150. The straps 170, 172 preferably comprise Velcro straps so that the distal ends of the first straps 170a, 172a couple to the top surface of the straps 170, 172.

Figure 7A:
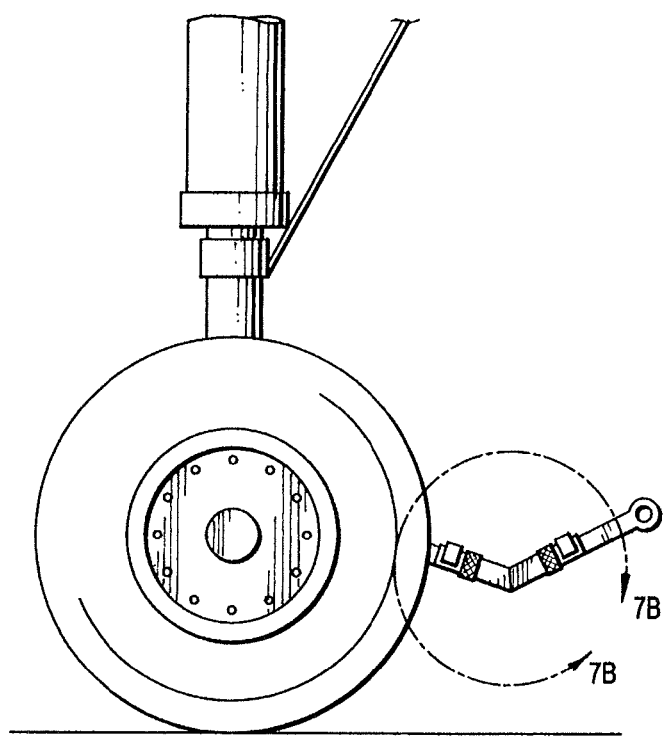
FIGS. 7A and 7B are side views of the towing adapter in use with an aircraft torque link.
Figure 7B:
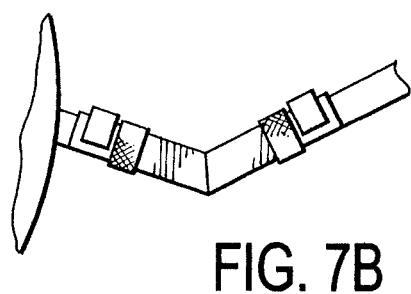
Figure 8:
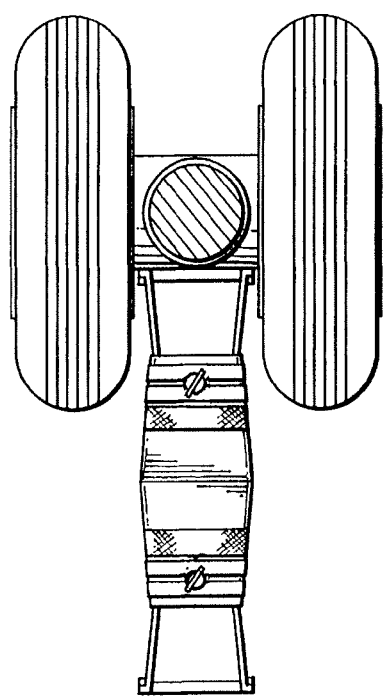
FIG. 8 is a top view of the towing adapter in use with an aircraft torque link.

The operation of the towing adapter 100 will now be discussed with reference to FIGS. 7 and 8. As shown, the towing adapter 100 connects to the first and second struts 12, 14 of the torque link assembly 10. The upper strut 12 is removed from the upper connection 24, and then lowered into position. The towing adapter 100 is then placed over both of the arms, with the bend in the towing adapter 100 aligned with the pivot point 20 of the torque link assembly 10. If needed, the wing nuts can be loosened, the support members 110, 150 widened apart or narrowed together to fit the width of the struts 12, 14, and then the wing nuts can be tightened to lock the towing adapter 100.

The bottom rubber-coated surface of the top platforms 112, 152 lie against the top surface of at least a portion of each of the first and second struts 12, 14. The downward-extending sides 114, 154 of the towing adapter 100 extend downward over the sides of the first and second struts 12, 14. Accordingly, the sides 114, 154 prevent the struts 12, 14 from coming free from the towing adapter 100.

Once the towing adapter 100 is in place over the struts 12, 14, the first Velcro straps 170a, 172a are extended around the underside of the struts 12, 14, looped through the O-shaped rings 175, 173, and wrapped back around to fasten on the top of the straps 170, 172. The Velcro straps 170, 172 lock the towing adapter 100 to the struts 12, 14 and lock the struts 12, 14 at a fixed angle with respect to one another. Accordingly, the upper strut 12 is prevented from falling down with respect to the lower strut 14 to avoid damage or injury. The torque link assembly 10 is thereby easier to handle and use, and facilitates attachment to a towing vehicle. Thus, the towing adapter 100 is easy to use and remove. It also does not interfere with the general use and operation of the torque link assembly 10.

Figure 9:
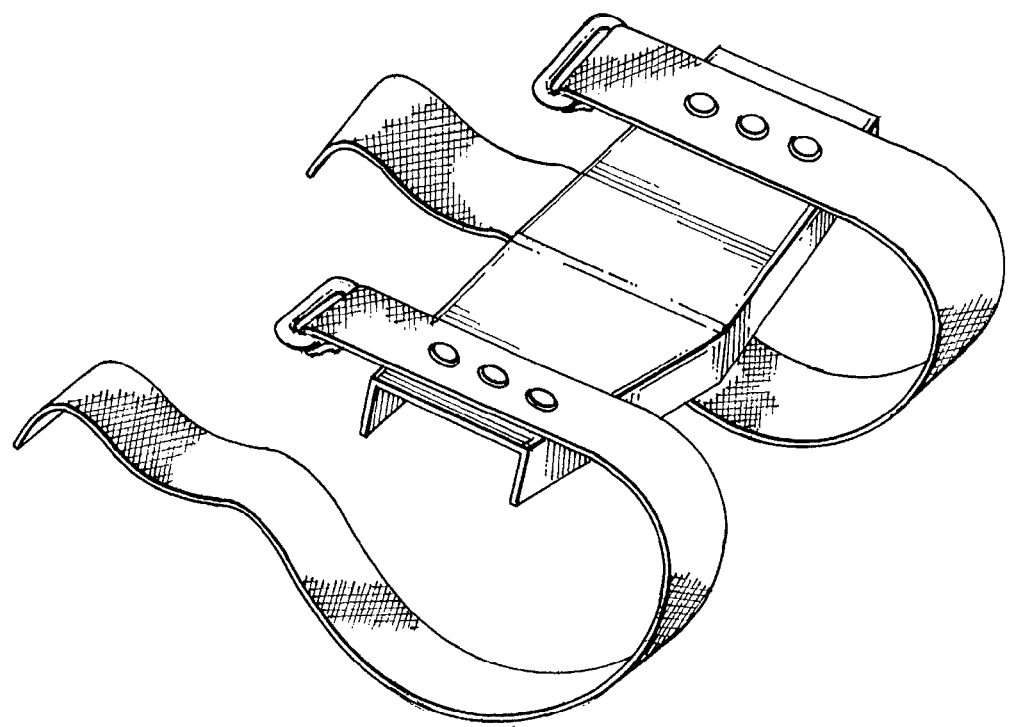
FIG. 9 is a perspective view of an alternative embodiment of the towing adapter.

Turning to FIG. 9, an alternative embodiment of the invention is shown. Here, the towing adapter does not have two separate elongated supported members 110, 150 as in FIGS. 2-8. Rather, a single uniform support member is provided having a fixed width. This embodiment is suitable for many standard-sized struts 12, 14, though the adapter of FIGS. 2-8 can form a more customized fit to a wider range of struts 12, 14.

It is noted that the invention is described and shown as a separate adapter 100 that connects to the struts of the towing assembly 10. It should be appreciated, however, that the invention need not be an adapter but can be a member formed integrally with the torque link assembly 10. Thus, the invention can be any device that restricts the movement of the struts 12, 14 when the upper connection 24 is released.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A towing/torque link adapter for engaging an object, said adapter comprising:
   an elongated metal platform having a bend at a middle transverse axis of said elongated metal platform to define a first platform portion and a second platform portion at a predetermined angle with respect to the first platform portion whereby said first and second platform portions form a general V-shape;
   a fastening strap coupled to said elongated metal platform for engaging the object; and
   a rubber coating at a bottom surface of said elongated metal platform.

2. The adapter of claim 1, said elongated metal platform having metal sides extending downward at longitudinal sides of said elongated metal platform, wherein the rubber coating is at an inside surface of said metal sides.

3. The adapter of claim 1, wherein said elongated metal platform comprises a first elongated metal platform and a second elongated metal platform spaced apart from and substantially parallel to said first elongated metal platform to define a gap therebetween.

4. The adapter of claim 3, further comprising a cross-support member for adjustably coupling the first elongated metal platform and said second elongated metal platform to thereby adjust a size of the gap.

5. The adapter of claim 1, said elongated metal platform having metal sides extending downward at the longitudinal sides of said elongated metal platform.

6. The adapter of claim 1, wherein said metal platform has a first outer surface and a second outer surface opposite said first outer surface, and said fastening strap is coupled to the first outer surface, and wraps around said metal platform to engage the object at the second outer surface of said metal platform.

7. The adapter of claim 6, wherein said first outer surface comprises a top surface and said second outer surface comprises a bottom surface.

8. The adapter of claim 5, wherein the object is received between the sides, said metal platform has a first outer surface and a second outer surface opposite said first surface, and said fastening strap is coupled to the first outer surface, and wraps around said metal platform to engage the object at the second outer surface of said metal platform between the sides.

9. The adapter of claim 8, wherein said first outer surface comprises a top surface and said second outer surface comprises a bottom surface.

10. A torque link adapter for engaging a link assembly having a first strut rotatably coupled to a second strut about a connect point, said adapter comprising:
    an elongated metal platform having a bend at a middle transverse axis of said elongated metal platform to define a first platform portion and a second platform portion at a predetermined angle with respect to the first platform portion whereby said first and second platform portions form a general V-shape;
    a first fastening strap coupled to said first platform portion to engage the first strut; and
    a second fastening strap coupled to said second platform portion to engage the second strut.

11. The adapter of claim 10, wherein said adapter retains the first strut at a fixed angle with respect to the second strut.

12. The adapter of claim 10, wherein said metal platform has a first outer surface and a second outer surface opposite said first outer surface, and said fastening strap is coupled to the first outer surface, and wraps around said metal platform to engage the link assembly at the second outer surface of said metal platform.

13. The adapter of claim 12, wherein said first outer surface comprises a top surface and said second outer surface comprises a bottom surface.

14. A towing/torque link adapter for engaging an object, said adapter comprising:
    an elongated metal platform having a bend at a middle transverse axis of said elongated metal platform to define a first platform portion and a second platform portion at a predetermined angle with respect to the first platform portion whereby said first and second platform portions form a general V-shape, wherein said elongated metal platform comprises a first elongated metal platform and a second elongated metal platform spaced apart from and substantially parallel to said first elongated metal platform to define a gap therebetween;
    a cross-support member adjustably coupling the first elongated metal platform and said second elongated metal platform to thereby adjust a size of the gap, wherein said cross-support member comprises a set of support arms extending across the gap and defining a slot therebetween, and a fastening mechanism coupled to the set of support arms at the slot; and
    a fastening strap coupled to said elongated metal platform for engaging the object.

15. The adapter of claim 14, wherein the fastening mechanism comprises a bolt with a wing nut.

16. The adapter of claim 14, wherein said metal platform has a first outer surface and a second outer surface opposite said first outer surface, and said fastening strap is coupled to the first outer surface, and wraps around said metal platform to engage the object at the second outer surface of said metal platform.

17. The adapter of claim 16, wherein said first outer surface comprises a top surface and said second outer surface comprises a bottom surface.

* * * * *

UNITED STATES PATENT AND TRADEMARK OFFICE
CERTIFICATE OF CORRECTION

| | | |
|---|---|---|
| PATENT NO. | : 8,690,180 B1 | Page 1 of 1 |
| APPLICATION NO. | : 13/790938 | |
| DATED | : April 8, 2014 | |
| INVENTOR(S) | : Ronald R. Baade et al. | |

It is certified that error appears in the above-identified patent and that said Letters Patent is hereby corrected as shown below:

On the title page, item (73), correct the spelling of the Assignee's name from "HG Aircraft Products LLC" to -- BG Aircraft Products LLC --

Signed and Sealed this
Nineteenth Day of August, 2014

Michelle K. Lee
*Deputy Director of the United States Patent and Trademark Office*